(12) United States Patent
Xue et al.

(10) Patent No.: US 10,176,218 B2
(45) Date of Patent: Jan. 8, 2019

(54) ODATA CUSTOM QUERY COMPOSER

(71) Applicant: SAP SE, Walldorf (DE)

(72) Inventors: Yunjiao Xue, Waterloo (CA); David Brandow, Guelph (CA)

(73) Assignee: SAP SE, Walldorf (DE)

( * ) Notice: Subject to any disclaimer, the term of this patent is extended or adjusted under 35 U.S.C. 154(b) by 431 days.

(21) Appl. No.: 14/536,061

(22) Filed: Nov. 7, 2014

(65) Prior Publication Data

US 2016/0132552 A1 May 12, 2016

(51) Int. Cl.
*G06F 17/30* (2006.01)

(52) U.S. Cl.
CPC .............................. *G06F 17/30392* (2013.01)

(58) Field of Classification Search
None
See application file for complete search history.

(56) References Cited

U.S. PATENT DOCUMENTS

| | | | | |
|---|---|---|---|---|
| 2005/0015368 A1* | 1/2005 | Payton | ............... | G06F 17/30595 |
| 2009/0228440 A1* | 9/2009 | Leff | ................... | G06F 17/30424 |
| 2010/0293523 A1* | 11/2010 | Ahadian | ................... | G06F 8/10 |
| | | | | 717/108 |
| 2012/0246334 A1* | 9/2012 | Yang | ....................... | H04L 69/08 |
| | | | | 709/232 |
| 2013/0290880 A1* | 10/2013 | Wu | .................... | G06F 17/30569 |
| | | | | 715/764 |
| 2013/0304799 A1* | 11/2013 | Lutter | ............... | G06F 17/30477 |
| | | | | 709/203 |
| 2015/0095365 A1* | 4/2015 | Olenick | ............ | G06F 17/30654 |
| | | | | 707/766 |
| 2015/0161235 A1* | 6/2015 | Libfeld | ............... | G06F 17/3056 |
| | | | | 707/607 |

OTHER PUBLICATIONS

Graus, Arthur, http://www.arthurgraus.nl/sharepoint-apps/odata-query-builder, Apr. 13, 2014, accessed Dec. 22, 2016.*
Tiwari, Ram, https://www.youtube.com/watch?v=rrS1jCY5Ito at 0:53, Mar. 8, 2014, accessed Dec. 22, 2016.*
Graus, Arthur, https://web.archive.org/web/20140413173843/http://www.arthurgraus.nl/sharepoint-apps/odata-query-builder, Apr. 13, 2014, accessed Jun. 2, 2017.*

* cited by examiner

*Primary Examiner* — Mark D Featherstone
*Assistant Examiner* — Ranjit P Doraiswamy
(74) *Attorney, Agent, or Firm* — Jones Day (57) ABSTRACT

A system and a method for creating an OData custom query involve retrieving properties for a data object defined in a software application, and then displaying a graphical user interface by which the retrieved properties are selected together with additional options. A plurality of partial queries are created based on the selected properties and the additional options. The partial queries are combined to form a complete OData query for the software application.

16 Claims, 12 Drawing Sheets

ODATA CUSTOM QUERY COMPOSER

FIELD OF THE INVENTION

The present invention relates to software tools for creating custom queries to an OData service.

BACKGROUND INFORMATION

OData is a Web-based data access protocol for requesting and updating data. OData applies and builds upon Web technologies such as Hypertext Transfer Protocol (HTTP), Atom Publishing Protocol (AtomPub), and JavaScript® Object Notation (JSON) to provide access to information from a variety of applications, services, and data stores. OData may be used to expose and access information from a variety of sources including, but not limited to, relational databases, file systems, content management systems and traditional websites.

Software applications often make calls to an OData service to, for example, request access to a data object exposed by the OData service. When creating a software application that makes OData requests, a software developer needs high working knowledge of how OData queries are structured. The structure includes specific types of queries, which follow specific rules including syntax. A developer with little or no knowledge of this structure is unable to take advantage of OData's support for complex queries. Additionally, even experienced developers can sometimes make mistakes such as ignoring case sensitivity or spelling errors. Such mistakes are difficult to avoid when creating complex queries.

SUMMARY

Example embodiments of the present invention relate to a system and methods for creating OData custom queries.

An example method for creating an OData custom query involves retrieving properties for a data object defined in a software application; displaying a graphical user interface by which the retrieved properties are selected together with additional options; creating a plurality of partial queries based on the selected properties and the additional options; and combining the partial queries to form a complete OData query for the software application.

An example system for creating an OData custom query includes a software development tool that: retrieves properties for a data object defined in a software application; displays a graphical user interface by which the retrieved properties are selected together with additional options; creates a plurality of partial queries based on the selected properties and the additional options; and combines the partial queries to form a complete OData query for the software application. The system further includes an intermediary application server that receives the complete OData query from a deployed instance of the application, forwards the complete OData query to an OData service for handling, and passes a result returned from OData service to the deployed instance of the application.

DETAILED DESCRIPTION

Example embodiments of the present invention relate to a system and methods for creating OData custom queries. In the example embodiments a software tool provides graphical user interfaces (GUIs) which enable a user to create OData custom queries in an intuitive, user friendly manner. The tool streamlines the process of creating queries by providing point-and-click elements that guide the user through the process. The tool also ensures that queries are correctly structured in accordance with OData specifications. By combining a simple point-and-click user interface in which user input mainly involves selecting from a set of displayed options, then forming OData compliant queries based on those selections, the tool guarantees the correctness of the queries.

Figure 1:
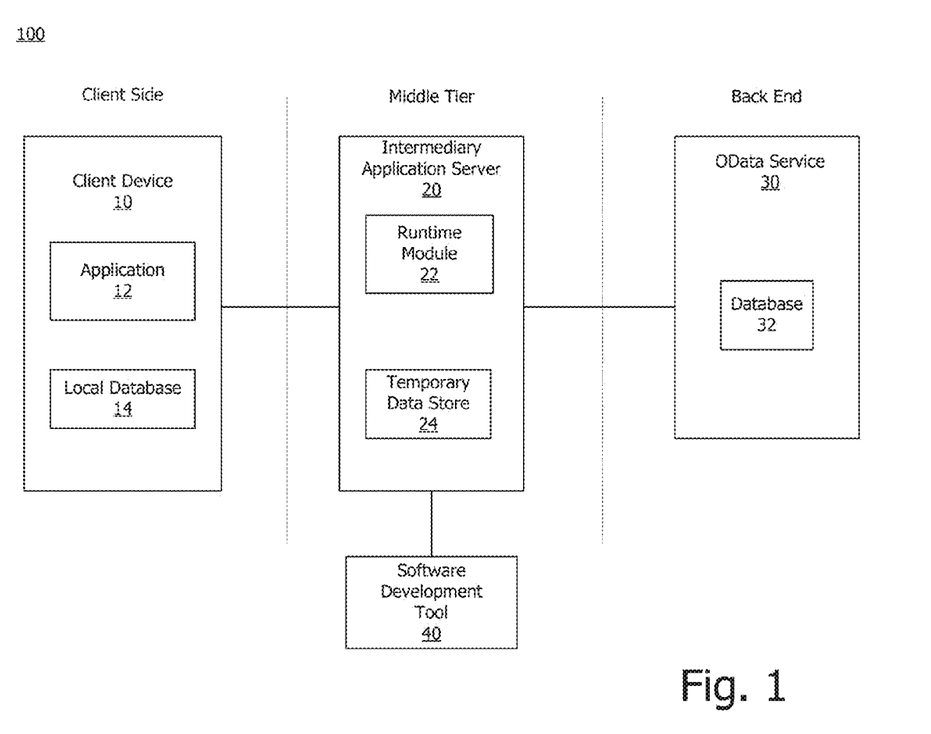
FIG. 1 is a block diagram of a system for accessing data objects provided through an OData service according to an example embodiment of the present invention.

FIG. 1 shows a system 100 for accessing an OData service according to an example embodiment of the present invention. The system 100 is divided into three sections: a client side, a middle tier and a back end. The client side includes a client device 10, which is a mobile computing device such as a laptop, a tablet or a smartphone. The middle tier includes an intermediary application server 20. The back end includes an OData service 30. Additionally, the system 100 may include a software development tool 40 by which a developer creates the application 12. In an example embodiment, the tool 40 is integrated with an overall software development program such as SAP Agentry™ Editor, which provides an integrated development environment (IDE) for creating software applications that run on mobile devices such as laptops, smartphones and tablets. Alternatively, the tool 40 may be implemented as a standalone program that modifies the source code of a software application created using a separate development tool.

The client device 10 includes a software application 12 and a local database 14. The application 12 includes a set of definitions, which are loaded from the intermediary application server 20, and which specify the functions performed by the application, including, for example, making requests to an OData service. The client device 10 is not platform specific, but is instead representative of a mobile device running one of any number of conventional mobile platforms such as Windows Mobile, Windows Phone, Palm OS, Android and iOS.

The intermediary application server 20 manages the application 12 and may be implemented as an SAP Mobile Platform (SMP) server that executes a runtime module 22, for example, an Agentry™ runtime component. The runtime module 22 handles data access requests from the client device 10 to the OData service 30. The intermediary application server 20 may also include a temporary data store 24 as a storage area for data in connection with requests. The format in which the data store 24 stores data does not need to be the same as the format of the database 14 or a database 32 that the OData service 30 exposes.

The OData service 30 wraps the database 32, which stores data objects that are accessed (e.g., created, read, modified or deleted) in response to client requests. Responses to data access requests referring to the data objects in the database 32 are output using the OData protocol, and the OData service 30 may only be responsive to OData compliant requests. For example, if the request is in the form of an OData query, it must follow the rules and structure of the OData specification.

In an example embodiment, the intermediary application server 20 may operate as an intermediary between the client device 10 and an additional data service besides the OData service 30, for example, a Structured Query Language (SQL) server or a Web service. Thus, the intermediary application server 20 may be configured to handle SQL requests and/or generic HTTP requests. For example, a generic HTTP request to a Web service may be formatted according to the Simple Object Access Protocol (SOAP). A Web service receiving this generic HTTP request may return Extensible Markup Language (XML) data. Thus, the application 12 may communicate with multiple types of back end services such as relational databases, Java servlets, Web services or file systems.

Figure 2:
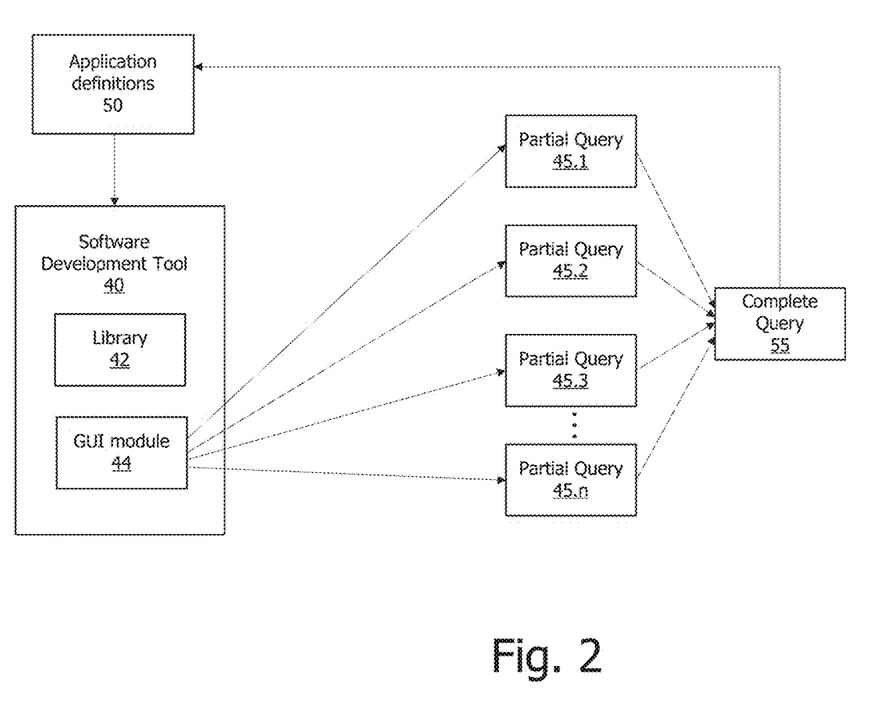
FIG. 2 is a block diagram showing details of a custom query composer tool according to an example embodiment of the present invention.

FIG. 2 is a block diagram showing details of the tool 40, which may provide GUIs for creating OData custom queries. Example GUIs will be described later. To support query creation, the tool 40 may include a software library 42 containing the rules and structure for OData queries. The library 42 may be updated periodically to reflect changes in the OData specification. As will be explained, the tool 40, when executed, provides a workspace for creating partial queries one at a time, based on user input. A GUI module 44 includes program instructions that output the GUIs to receive user input for creating OData queries. The GUI module 44 generates the user interface elements based on application definitions 50 for a software application that is being developed, e.g., the application 12.

In FIG. 2, representative partial queries 45.1 to 45.*n* are combined to form a complete query 55. Each partial query 45.*x* may correspond to a different one of the various types of query options allowed in OData, such as a filter option and an OrderBy (sort) option. The complete query 55 is saved, e.g., as part of the definitions 50 so that the complete query is issued by the application in accordance with the definitions. Thus, the application definitions 50 may specify the conditions under which the complete query 55 will be sent from the application 12 to an OData service such as the OData service 30.

Figure 3:
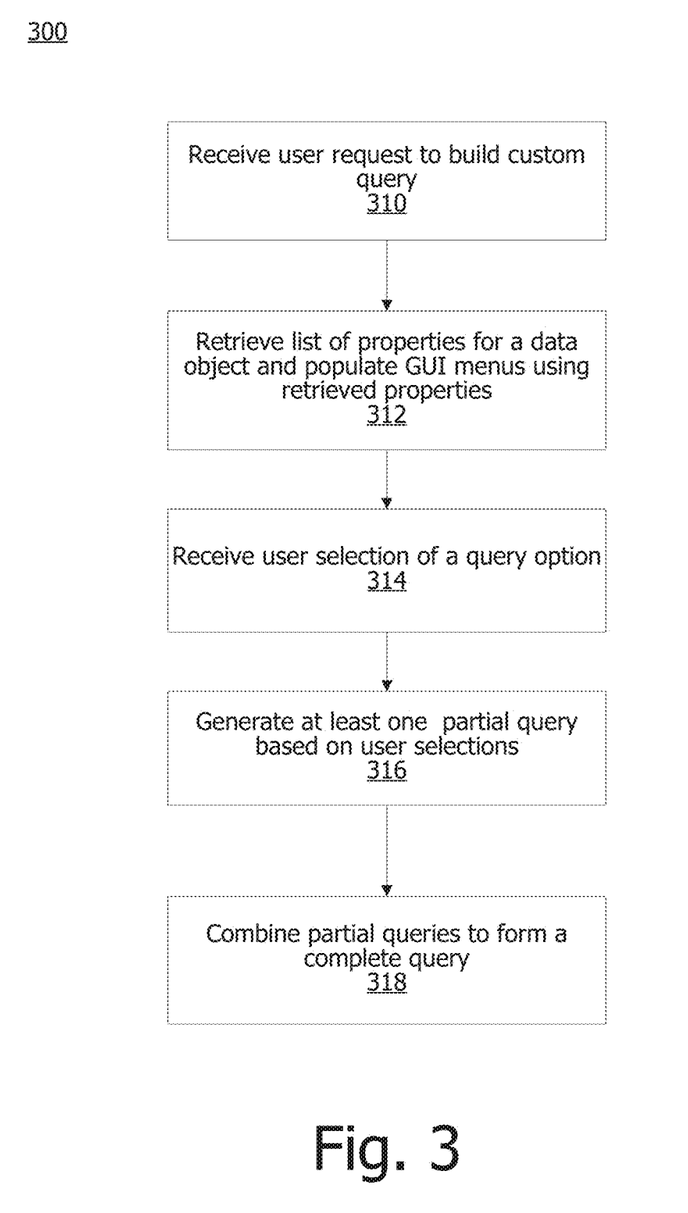
FIG. 3 is a flowchart of a method for creating OData custom queries according to an example embodiment of the present invention.

FIG. 3 is a flowchart of a method 300 for creating OData custom queries according to an example embodiment of the present invention. The method 300 may be performed using the system 100. At step 310, the tool 40 receives a user request to build a custom query. If the tool 40 is integrated with another development tool by which the application 12 is created, then the user request may be initiated within the other tool. The user request may specify an OData service (e.g., the service 30) and an entity set for a data object being retrieved (e.g., a "Product" entity set contained in the definitions 50).

At 312, the tool 40 retrieves a list of data object properties contained in the entity set and populates GUI menus using the retrieved properties. The data object is an object defined by the software developer and may represent a corresponding object in the database 32 or another database, e.g., a second database exposed by the OData service 30 or a database exposed by a Web service. OData is not limited to databases. Therefore the object of an OData query does not need to reside in the database 32, but could potentially be stored elsewhere.

At 314, the tool 40 receives a user selection of a query option corresponding to one of the OData query options to begin work on a partial query. In an example embodiment, a separate workspace is provided for each query option in the form of a tab in a window. The tool 40 allows the user to switch between tabs, and therefore move from one query option to another. Thus, the user can work on a partial query of one query option and then begin another partial query of a different option, without necessarily completing the work for the first partial query. The user can also jump back to the first partial query at any time to make changes even if the first partial query has already been completed. In the OData data model, entity sets are named collections of entities, i.e., data objects. For example, "Customers" could be an entity set containing Customer entities. An OData entity is an instance of an entity type (e.g., Customer) and includes a set of named properties. Properties may be declared as part of the entity type's definition (declared properties) or left undeclared (dynamic properties).

At 316, the tool 40 generates at least one partial query based on further user selections, which can be input through a GUI provided specifically for the query option that the user selected in step 314. Options from which the user can select may therefore vary depending on a query option, but at least some of the selections will designate one or more of the properties retrieved in step 312. For example, to form a filter option, the user may select one or more retrieved properties that should be included or excluded in a search result returned by the OData service 30.

At step 318, the partial queries are combined to form a complete query, which is saved for subsequent use by a deployed instance of the application 12. Although the tool 40 provides the ability to form complex queries that combine many query options, the tool 40 can also be used to form a simple query. For example, the following is an example query in the form of a Uniform Resource Identifier (URI) for retrieving data concerning "product" objects in an OData service:

http://services.odata.org/OData/OData.svc/Products.

This example query returns all products and may be acceptable where, for example, there are few products in the database and the developer is interested in all the information concerning the products. However, there are circumstances where it is preferable to form a more complex query. For example, if there are many products in the database, retrieving them could be time and resource intensive, potentially causing network timeouts and crashing the application 12. The number of products may be so large that it would take a prohibitive amount of time to query and subsequently transfer their data for display at a client device, not to mention being cumbersome to navigate through, whereas the list of products that are typically of interest at any point in time is often quite small. Therefore it may not always be desirable to allow the application 12 to retrieve all the products or all the properties for a particular product.

Regardless of the size of the potential results, the end user may only be interested in a specific product or a product that meets certain conditions. For example, the user of the client device 10 may be a sales representative who is only interested in seeing products available in a particular region, department or some other attribute specific to that representative. Therefore, designing the application 12 to allow filter options may provide an optimized search for the end user. Additionally, filtering based on a user-specific attribute may provide a security feature in which data objects that the end user is not supposed to access are prevented from being returned.

The developer may also wish to have the query results formatted in a certain way. Extensible Markup Language (XML) is typically the default format. Additionally, it may be desirable to order the results based on product properties or to retrieve other data objects related to the product as part of a single query. In this regard, OData Top and Skip options can facilitate memory management at the client device by, for example, dynamically shifting a virtual paging window through the entire set of results over a period of time (e.g., over several queries instead of a single query) so that the results are limited to a size that avoids the need for a large amount of paged resources, e.g., buffers used by a paging system of the client device. In each of the above described situations, the simple query shown above is inadequate. The tool 40 may enable the user to form custom queries that address each of the above mentioned circumstances, and therefore provides flexibility for creating queries to fit a wide range of application needs.

The functionality of the tool 40 will now be explained in connection with example GUIs shown in the drawings. One of the advantages of the tool 40 is that it enables the user to create a complex query in an intuitive, user friendly manner that does not require extensive knowledge of the OData specification. The following is an example of a relatively complex query string:

---
http://services.odata.org/OData/OData.svc/Products?$filter=
(SupplierID ne 100 and CategoryID eq 5) and (UnitPrice ge 5000 or
UnitPrice le 1000)&$inlinecount=allpages&$orderby=
ProductName asc,UnitPrice desc$select=ProductID,ProductName,
UnitPrice,ReorderLevel&$skip=10&$top=100
---

The above query retrieves products that are not provided by supplier number 100, that belong to category number 5, and whose unit price is greater than 5000 or less than 1000. Additionally, the result includes a count of the total number of products retrieved. Further, the results are ordered by product name in ascending order and then by unit price in descending order. The results will not include all properties of the products, but are instead limited to product ID, product name, unit price, and reorder level. Finally, the first 10 results are skipped and only the next 100 matching results are retrieved.

Figure 4:
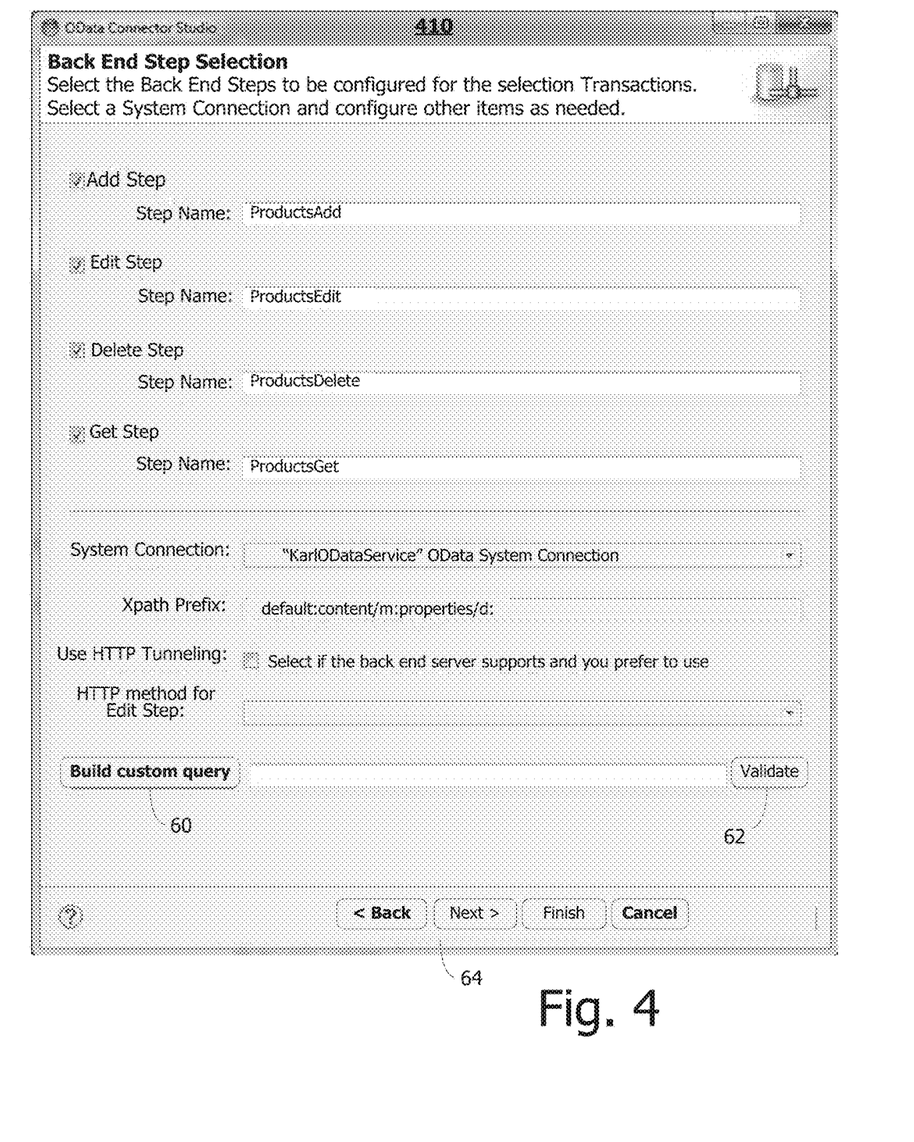
FIG. 4 is a graphical user interface for creating an OData custom query according to an example embodiment of the present invention.

FIG. 4 is a GUI 410 for launching a custom query composer tool according to an example embodiment of the present invention. In FIG. 4, the tool is integrated with another development tool and is launched in a dialog box by which back end OData steps (e.g., add, edit, delete and get) are configured. The tool is launched via a "Build custom query" option 60. The GUI 410 also includes a "Validate" option 62 that triggers a validation process in which the tool checks a complete query and/or all partial queries against stored rules for compliance with OData requirements. A navigation bar 64 includes a "Next" option for confirming a current selection (e.g., "Build custom query") and moving forward to the next GUI menu.

Figure 5:
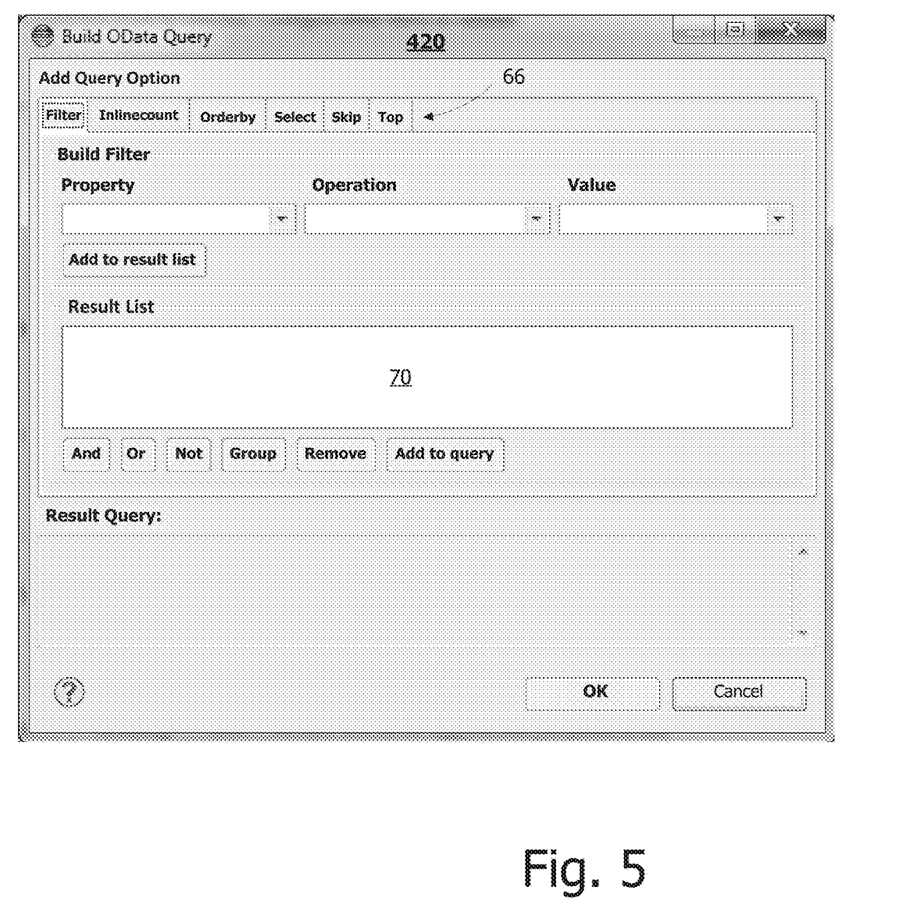
FIG. 5 is a graphical user interface for creating an OData filter query according to an example embodiment of the present invention.

FIG. 5 is a GUI 420 for creating an OData filter option according to an example embodiment of the present invention. The filter query is one of the more complex OData queries and follows Augmented Backus-Naur Form (ABNF) grammar. An expression defining a filter option may comprise multiple atomic expressions that are connected by logical operators such as AND, OR and NOT. Each atomic expression is of the form <Property Operation Value>. For example, <SupplierID ne 100> is an atomic expression meaning SupplierID is not equal to 100. As shown in FIG. 5, the filter option is assigned to a separate tab in the GUI 420. Additional tabs are assigned to Inlinecount, Orderby, Select, Skip and Top. The functionality of these additional tabs will be explained in connection with further example GUIs.

The GUI 420 includes a set of dropdown menus for selecting Property, Operation and Value. The combination of these three elements forms a single atomic expression, which can be added to a result list 70 via an "Add to result list" option. Atomic expressions may also be removed from the result list 70 on an individual or group basis. As mentioned earlier, the tool may retrieve a list of properties for a selected entity set. In this example, the user may have selected a "product" entity set in which "SupplierID" is a property of the entity set. Consequently, the tool will have populated the Property dropdown menu to include SupplierID as a selectable property. In an example embodiment, Property and Operation can only be selected from a list, e.g., the dropdown menus. This is advantageous because it spares the user from having to manually type in the properties and operations. Additionally, correctness is guaranteed because the property list is pre-populated based on the selected entity set (so that the user cannot input an invalid property) and the operation list is predefined (so that the user cannot input an invalid operation). However, the tool may enable the user to type in a literal constant as the value in the atomic expression, to select from among any of the pre-populated properties and to, as an alternative to specifying a literal constant, define a parameter whose value is obtained at runtime.

Figure 6:
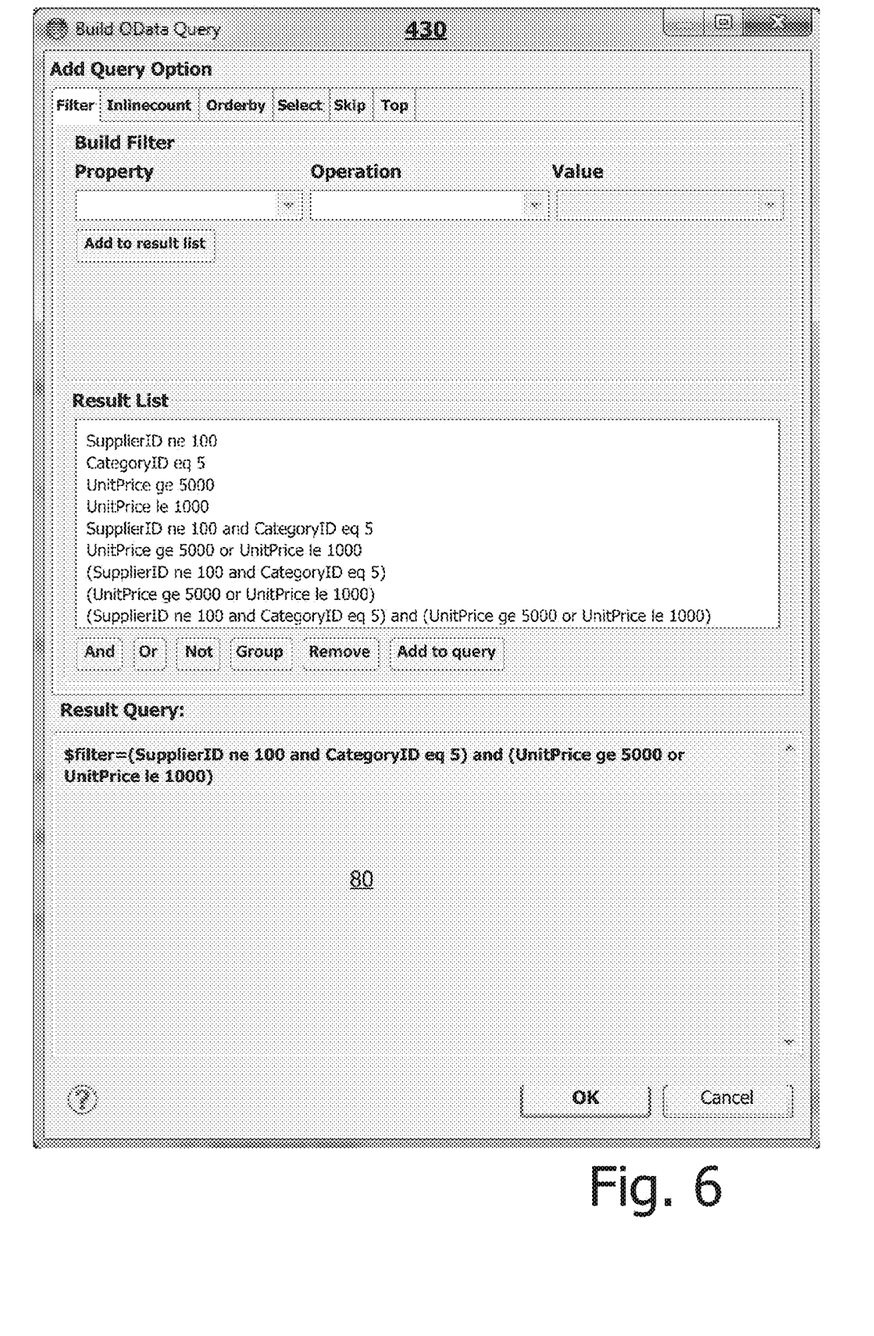
FIG. 6 is a graphical user interface for combining atomic expressions to form a partial query according to an example embodiment of the present invention.

FIG. 6 is a GUI 430 for combining atomic expressions to form a partial query according to an example embodiment of the present invention. Atomic expressions in the result list can be connected via logical connectors (e.g., AND, OR and NOT) to form a compound expression. AND and OR connect multiple atomic expressions together. NOT forms a compound expression as the negation of a single atomic expression. For example, the user can select the atomic expressions "SupplierID ne 100" and "CategoryID eq 5" and combine them by selecting the "And" option. As shown in FIG. 6, the result list displays a sequential history of the atomic expressions created by the user. When the atomic expressions are combined, the resulting compound expressions are added to the result list, e.g., "SupplierID ne 100 and CategoryID eq 5." Thus, the result list tends to begin with simple atomic expressions before progressing to more complex expressions. Compound expressions can also be combined by selecting the "Group" option, thereby forming even more complex compound expressions. For example, the above compound expression can be grouped with the expression "UnitPrice ge 5000 or UnitPrice le 1000." In this manner, the user can create any number of atomic and/or compound expressions, and is free to experiment with different combinations of expressions. Selecting an "Add to query" option will add a selected atomic expression or compound expression from the result list as a partial query. The resulting partial query is displayed in a "Result Query" window 80. In the example just described, the resulting partial query is a filter option that specifies SupplierID not equal to 100, CategoryID equal to 5, and UnitPrice greater than 5000 or less than 1000.

Figure 7:
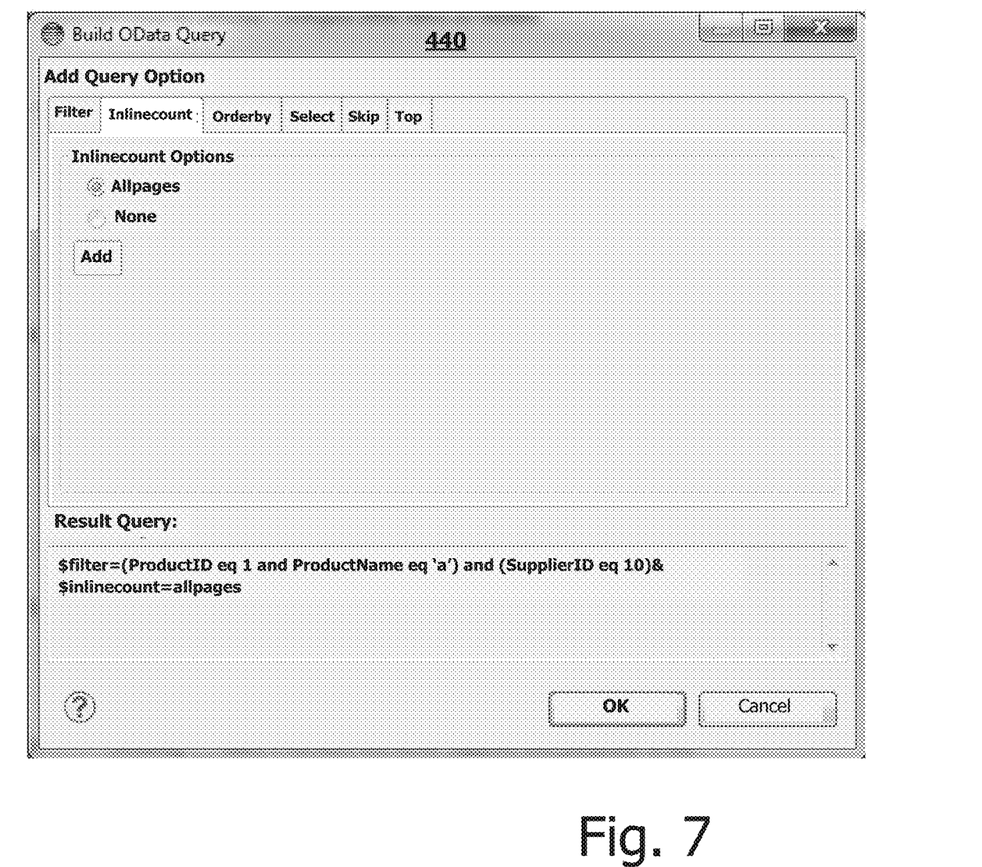
FIG. 7 is a graphical user interface for creating an OData Inlinecount query according to an example embodiment of the present invention.

FIG. 7 is a GUI 440 for creating an OData Inlinecount option according to an example embodiment of the present invention. The Inlinecount option enables the user to select a count of the total number of results returned. Inlinecount is disabled by selecting "None" or enabled by selecting "Allpages." In FIG. 7, the Inlinecount option is enabled and added to an example filter query, shown in the result query window.

Figure 8:
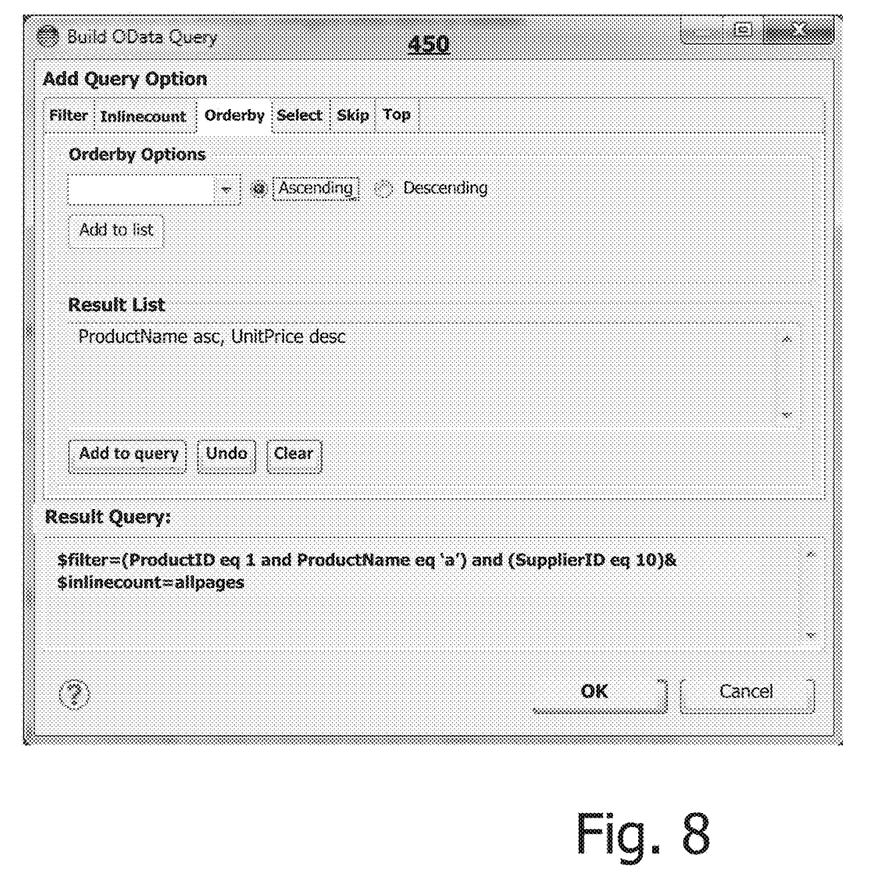
FIG. 8 is a graphical user interface for creating an OData Orderby query according to an example embodiment of the present invention.

FIG. 8 is a GUI 450 for creating an OData Orderby option according to an example embodiment of the present invention. The Orderby option enables the user to select a property and specify an order (ascending or descending) in which the property is sorted. Multiple properties can be specified. For example, in FIG. 8 the "ProductName" property is sorted in ascending order and "UnitPrice" is sorted in descending order. As mentioned earlier in connection with the filter query, the tool may obtain a list of properties and populate a menu to enable the user to select the properties in connection with query creation. In FIG. 8, the "Orderby Options" menu is a dropdown menu analogous to the "Property" menu in FIGS. 5 and 6.

Figure 9:
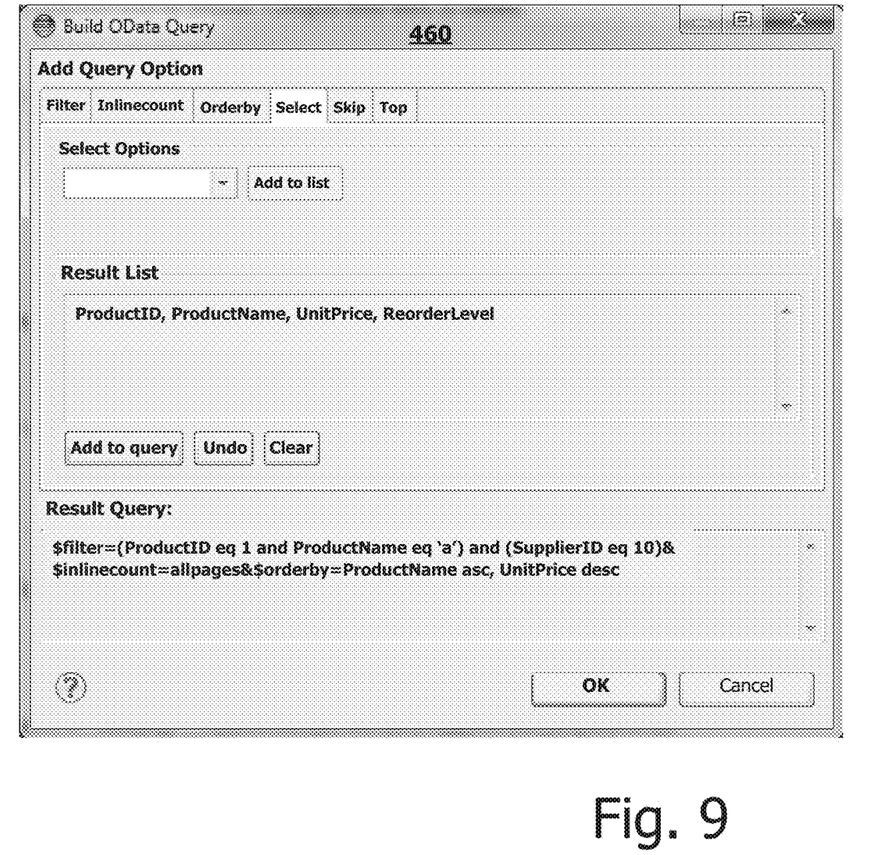
FIG. 9 is a graphical user interface for creating an OData Select query according to an example embodiment of the present invention.
Figure 10:
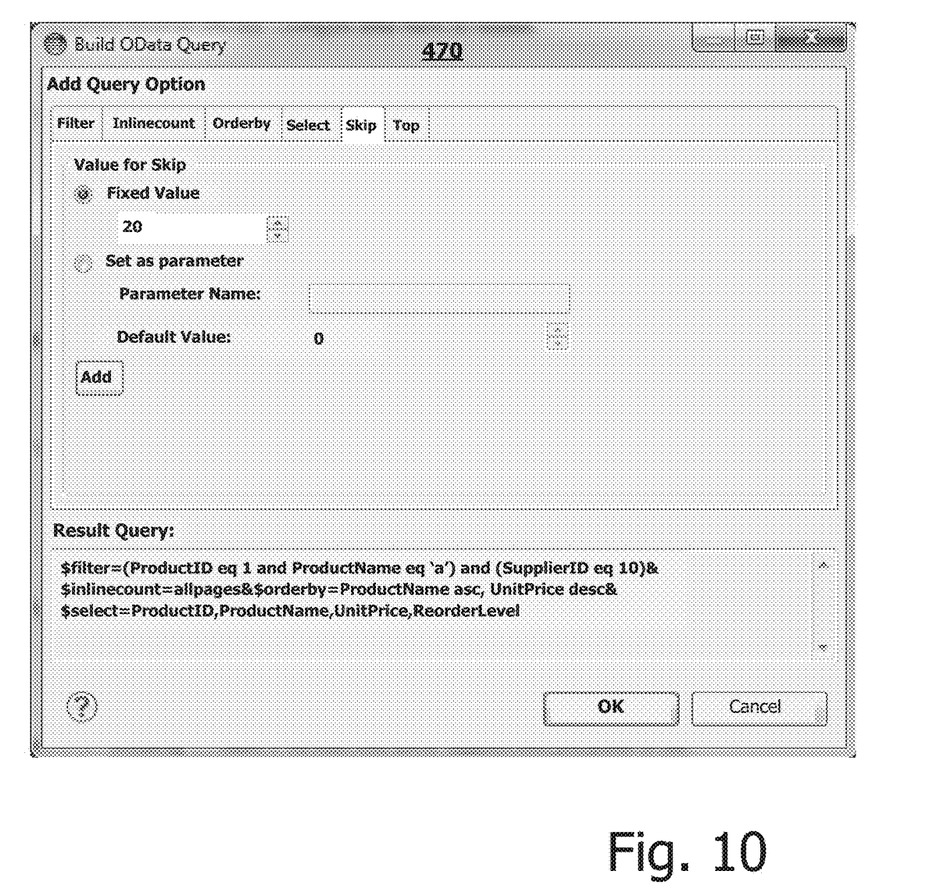
FIG. 10 is a graphical user interface for creating an OData Skip query according to an example embodiment of the present invention.

FIG. 9 is a GUI 460 for creating an OData Select option according to an example embodiment of the present invention. The Select option enables the user to request one or more properties to be returned. By default, all properties may be returned. By including the Select option, the results are restricted to only those properties specifically requested in the query. In FIG. 9, the requested properties are "ProductID," "ProductName," "UnitPrice," and "ReorderLevel." The properties may be returned in the order in which they are displayed in the result list. The user is free to change the order by, for example, removing the most recently added property through selecting an "Undo" option. FIG. 10 shows a resulting query that includes the above described Select option.

Figure 11:
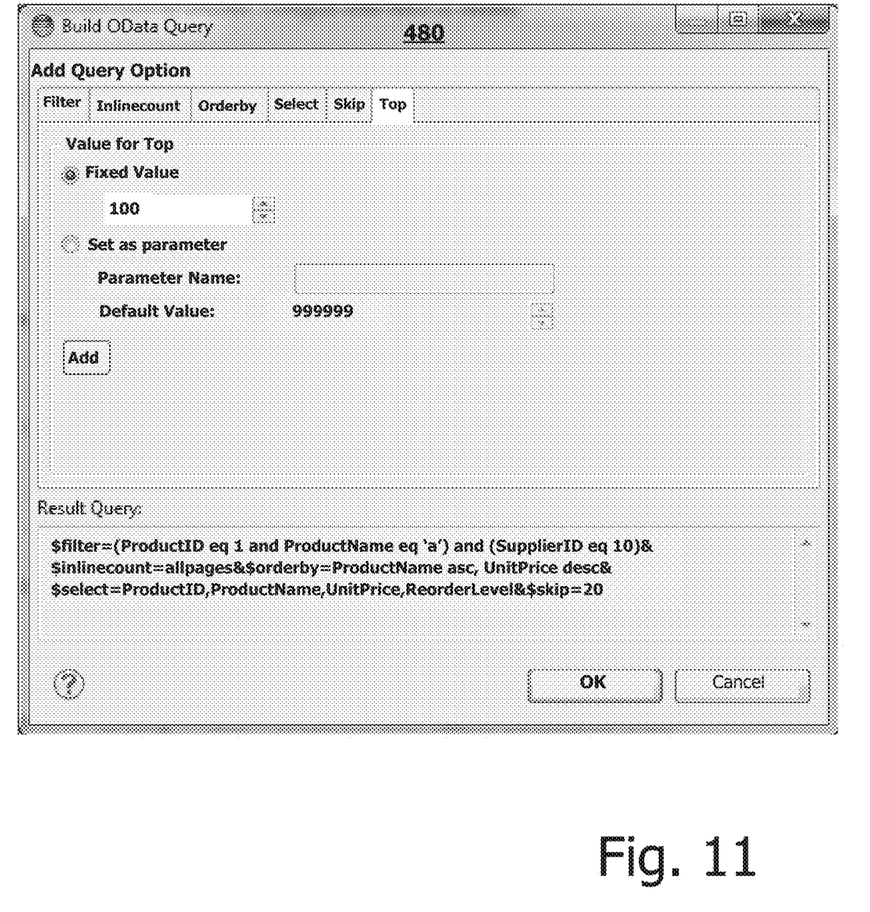
FIG. 11 is a graphical user interface for creating an OData Top query according to an example embodiment of the present invention.

FIG. 10 is a GUI 470 for creating an OData Skip option according to an example embodiment of the present invention. The Skip option enables the user to specify how many results to skip. The number of skipped results can be specified as a constant, e.g., 20 results. FIG. 11 shows a resulting query that includes the above described Skip option. As an alternative to specifying a constant skip value, the user can define a parameter whose value is not fixed, but is instead obtained at runtime by the application being developed. As shown in FIG. 10, the user can input the parameter name and provide a default value.

FIG. 11 is a GUI 480 for creating an OData Top option according to an example embodiment of the present invention. The Top option includes options similar to those described in connection with the Skip option of FIG. 10 and enables the user to limit the results returned, e.g., to the top 100 results or the top X number of results, where X is a user defined parameter whose value is obtained at runtime.

Figure 12:
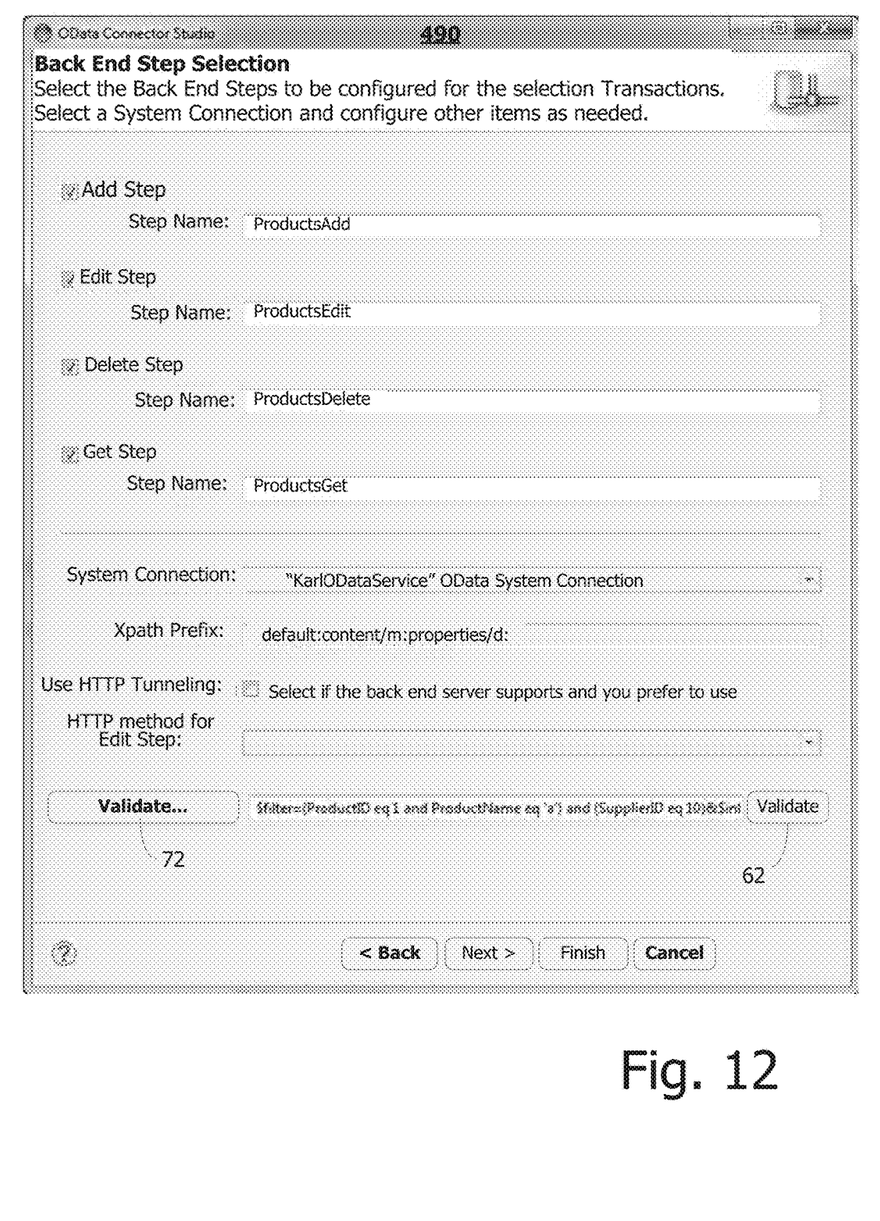
FIG. 12 is a graphical user interface for validating an OData custom query according to an example embodiment of the present invention.

FIG. 12 is a GUI 490 for validating an OData custom query according to an example embodiment of the present invention. Selecting the validate option 62 confirms the user's intent to validate the partial queries and/or validate a complete query, created using the previously described GUIs. The user may browse for a stored partial query or a stored complete query, which when selected is displayed in a text field next to the option 62. Selecting a stored query may trigger display of a second validate option 72, which when selected triggers a validation process applied to the selected query. In the validation process, the tool may compare the selected query against stored rules to ensure compliance with OData query requirements. Validation may involve the tool sending the query to the OData service to determine whether the OData service returns a result without any error message. If the query is non-compliant, the tool may display an error message explaining why. If the query includes multiple partial queries, the error message may identify which partial query or queries are non-compliant. After queries have been validated, they may be combined with a base query such as the base URI mentioned earlier:

http://services.odata.org/OData/OData.svc/Products

Combining a custom query with a base query may produce a complete HTTP request, which will be issued during runtime when conditions specified in the application's definitions are met. For example, when the user clicks a certain button displayed by the application.

An example embodiment of the present invention is directed to one or more processors, which can be implemented using any conventional processing circuit and device or combination thereof, e.g., a CPU of a Personal Computer (PC) or a mobile computer or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a non-transitory, hardware computer-readable medium, e.g., as described above, on which are stored instructions executable by a processor to perform any one or more of the methods described herein.

An example embodiment of the present invention is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination.

Therefore, while the embodiments of the present invention have been described in connection with particular examples thereof, the true scope of the embodiments and/or methods of the present invention should not be so limited since other modifications will become apparent to the skilled practitioner upon a study of the drawings and specification. For example, in addition to the query options explained earlier, other types of OData query options can be customized, including the OData Expand and Format options. The Expand option retrieves results from related entities. Thus, an example embodiment may include additional GUIs by which the user selects a related entity set, defines a custom query for an entity in the related entity set, validates the query, and then combines the query with an existing query for another entity. The Format option returns results in a format other than a default format, e.g., JavaScript Object Notation (Json) instead of XML. Further, steps illustrated in the flowcharts may be omitted and/or certain step sequences may be altered, and, in certain instances multiple illustrated steps may be simultaneously performed.

What is claimed is:

1. A computer-implemented method for creating an OData custom query, comprising:
  receiving, via a graphical user interface, selection of an entity set for a data object;
  retrieving, based on the selected entity set for the data object, properties for the data object defined in a software application;
  displaying, in the graphical user interface, the retrieved properties in graphical user interface elements;
  receiving, via the graphical user interface, a selection of the retrieved properties and additional options that each specify OData query operations;
  concurrently creating, using the graphical user interface, a plurality of OData partial queries based on the selected properties and the additional options;
  validating the partial queries against stored rules for compliance with OData requirements;
  combining the partial queries with a base query to form a complete OData query for the software application, the OData query being configured to access data specified therein within a database wrapped by an OData service;
  providing a separate workspace in the graphical user interface for each of a plurality of OData query options, each workspace being assigned a separate tab in a window in the graphical user interface;
  switching between workspaces in response to a request to begin work on a partial query of a different one of the query options before a partial query associated with a currently displayed workspace is complete, the request being initiated in response to user-generated input on the graphical user interface; and
  displaying a resulting query in each of the workspaces, wherein the resulting query includes all partial queries currently selected for inclusion in the complete OData query, in order of their inclusion.

2. The method of claim 1, further comprising:
  displaying a graphical user interface by which a property is selected from a list of the retrieved properties together with a logical operator from a list of predefined logical operators; and
  combining the selected property and the selected logical operator with a specified value to form an atomic expression for the at least one of the partial queries.

3. The method of claim 1, further comprising:
  displaying a graphical user interface by which a logical connector is selected from a list of predefined logical connectors; and
  applying the selected logical connector to at least one atomic expression to form a compound expression for the at least one of the partial queries.

4. The method of claim 3, further comprising:
  displaying a sequential history of expressions previously created by a user interacting with the graphical user interface, wherein each of the expressions displayed in the history is selectable for inclusion in a partial query and is ordered within the sequential history based on when such expression was created by the user.

5. The method of claim 4, further comprising:
  displaying graphical user interface options by which expressions from the result list are removed from the result list or added as a partial query in the complete OData query.

6. The method of claim 1, further comprising:
  displaying a graphical user interface by which at least one of an Inlinecount option, a Skip option and a Top option is selected for inclusion in the complete OData query.

7. The method of claim 1, wherein the at least one of the partial queries is a Filter option or a Select option, wherein the Filter option or the Select option restricts search results returned by the complete OData query, and wherein the restriction is based on the selected properties.

8. The method of claim 1, wherein the at least one of the partial queries is an Orderby option that sorts search results returned by the complete OData query, and wherein the search results are sorted based on the selected properties.

9. A system for creating an OData custom query comprising:
  at least one data processor;
  memory storing instructions which, when executed by the at least one data processor, implement a software development tool that:
    retrieves properties for a data object defined in a software application;
    displays a graphical user interface by which the retrieved properties are selected together with additional options that each specify OData query operations;
    concurrently creates, using the graphical user interface, a plurality of OData partial queries based on the selected properties and the additional options;
    validates the partial queries against stored rules for compliance with OData requirements;
    combines the partial queries with a base query to form a complete OData query for the software application;
    provides a separate workspace in a graphical user interface for each of a plurality of OData query options, each workspace being assigned a separate tab in a window in the graphical user interface;
    switches between workspaces in response to a request to begin work on a partial query of a different one of the query options before a partial query associated with a currently displayed workspace is complete, the request being initiated in response to user-generated input on the graphical user interface; and
    displays a resulting query in each of the workspaces, wherein the resulting query includes all partial queries currently selected for inclusion in the complete OData query, in order of their inclusion; and
  an intermediary application server that receives the complete OData query from a deployed instance of the application, forwards the complete OData query to an OData service wrapping at least one database for handling, and passes a result returned from OData service to the deployed instance of the application.

10. The system of claim 9, wherein the software development tool:
   displays a graphical user interface by which a property is selected from a list of the retrieved properties together with a logical operator from a list of predefined logical operators; and
   combines the selected property and the selected logical operator with a specified value to form an atomic expression for the at least one of the partial queries.

11. The system of claim 9, wherein the software development tool:
   displays a graphical user interface by which a logical connector is selected from a list of predefined logical connectors; and
   applies the selected logical connector to at least one atomic expression to form a compound expression for the at least one of the partial queries.

12. The system of claim 11, wherein the software development tool:
   displays a sequential history of expressions previously created by a user interacting with the graphical user interface, wherein each of the expressions displayed in the history is selectable for inclusion in a partial query and is ordered within the sequential history based on when such expression was created by the user.

13. The system of claim 12, wherein the software development tool:
   displays graphical user interface options by which expressions from the result list are removed from the result list or added as a partial query in the complete OData query.

14. The system of claim 9, wherein the software development tool:
   displays a graphical user interface by which at least one of an Inlinecount option, a Skip option and a Top option is selected for inclusion in the complete OData query.

15. The system of claim 9, wherein the at least one of the partial queries is a Filter option or a Select option, wherein the Filter option or the Select option restricts search results returned by the complete OData query, and wherein the restriction is based on the selected properties.

16. The system of claim 9, wherein the at least one of the partial queries is an Orderby option that sorts search results returned by the complete OData query, and wherein the search results are sorted based on the selected properties.

* * * * *